United States Patent Office 3,081,696
Patented Mar. 19, 1963

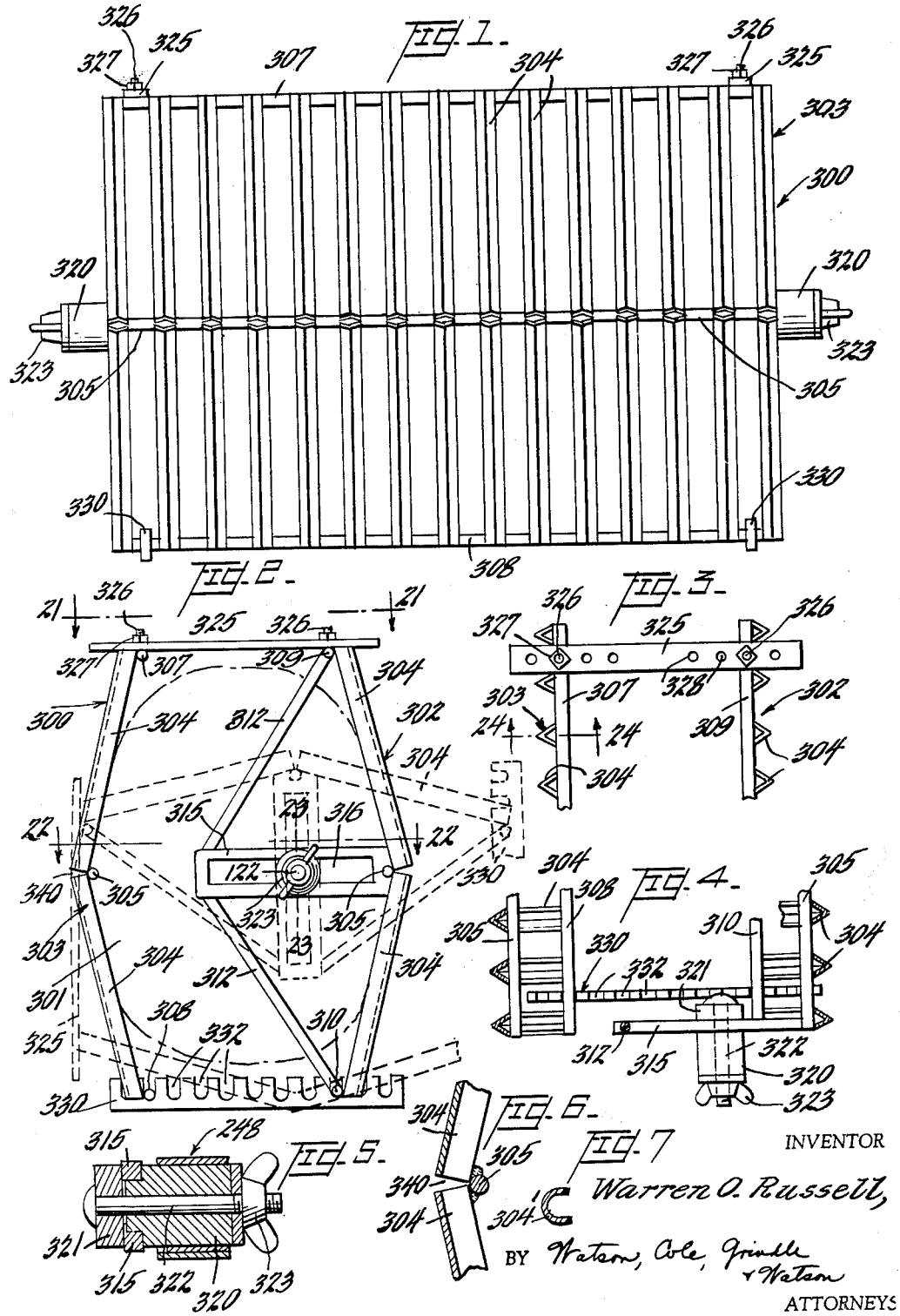

**3,081,696
COOKING APPARATUS**
Warren O. Russell, Rangeley, Maine
Original application Nov. 20, 1956, Ser. No. 623,427. Divided and this application June 7, 1961, Ser. No. 115,371
1 Claim. (Cl. 99—427)

This invention relates to cooking apparatus and more particularly to roasting or broiling grills useful in connection with camp cooking or "cook-outs" in relation to either camp fires or to charcoal or briquette fed sources of heat.

The general object of the invention is to provide a novel and improved grill of this type which is easy to set up, take down, or dismantle, and to operate for the efficient roasting or broiling of food of different kinds.

This application is a division of my co-pending application Serial No. 623,427, filed November 20, 1956.

The invention, in its preferred embodiments, contemplates the provision of a supporting grid or grill for roasting or broiling articles of food, particularly steaks, hams, roasts, poultry, or the like in such manner that ready adjustment may be made to the support for the grill with relation to the source of heat as to secure the maximum benefits of both radiant and convective heat currents.

Other features of novelty of the invention include adjustability of the grid or grill for accommodating various sizes and shapes of comestibles from thin, sliced meat such as steaks, up to hams or roasts of thicker or more bulky dimensions.

Other features of novelty include the provision of a particularly effective and convenient angular configuration of the grid bars of the broiler so as to accommodate the larger cuts of meat, the adjustability of the supporting means according to varying centers of gravity of the grill and its enclosed comestible, and the particular construction of the grid bars for purposes which will be fully described in the detailed specification.

Other objects and features of novelty will be apparent from the following specification when read in connection with the accompanying drawings in which one embodiment of the invention is illustrated by way of example.

In the drawings:

FIGURE 1 is a view in side elevation of a broiler grid embodying the principles of the invention;

FIGURE 2 is an end view of the same, showing in broken lines means for effecting a horizontal adjustment of the grid;

FIGURE 3 is a fragmentary top plan view of the grid substantially as shown from the line 21—21 of FIGURE 2;

FIGURE 4 is a fragmentary sectional view taken on line 22—22 of FIGURE 2;

FIGURE 5 is a detail sectional view taken on line 23—23 of FIGURE 2;

FIGURE 6 is a fragmentary sectional view taken on line 24—24 of FIGURE 3; and

FIGURE 7 is a view in transverse section through a modified form of grid bar which may be advantageously used in this device.

One embodiment of the novel broiler is illustrated in FIGURES 1-7 inclusive and is given the general reference designation 300. This broiler is, by virtue of its peculiar configuration, somewhat more adapted for the support of thicker cuts of meat and is well adapted to support roasts of different kinds such as indicated at 301. For this purpose the device is approximately hexagonal in end view, having a pair of opposed angular grids 302 and 303, these grids consisting of two series of angle iron strips 304, the abutting ends adjacent the center of the device being welded to the cross bar 305 as clearly shown in FIGURE 6. The opposite ends of the angle bars 304 are welded to the cross bars 307 and 308 on the one side and to the cross bars 309 and 310 on the other.

The grid framing on one side of the broiler is braced and supported in a manner different from the other in order to secure it to the outer ends of the crane arms in properly adjusted position both angularly with respect to the fire and bodily for purposes of supporting it as closely adjacent its center of gravity as possible. Thus, diagonal struts 312 extend from the rods 309, 310 to the slotted brackets 315 upon each side of the device. These brackets are each provided with an elongated slot 316 and a hub 320 is cut away at one end along parallel surfaces. A block or plate 321 is disposed upon the opposite side of the slotted bracket 315 and the bracket is clamped by means of the bolt 322 and the wing nut 323, when adjusted to a position along the slot 316 which represents the approximate center of gravity of the broiler and its contents.

The hubs 320 are adjustably clamped by means of the clamping members 248 which are more fully disclosed in the parent application Serial No. 623,427, of which this application is a division. The clamps 248 may be carried at the ends of any suitable supporting means such as the boom shown in that application. It is sufficient for present purposes to indicate that the entire grid may be rotated about the axis of the hubs 320 to present the comestible at optimum angles to the source of heat.

Continuing the description of the structure of this broiler element it will be noted that the top portion of the device as viewed in FIGURES 1 and 2 is comprised of the two transverse bars 325, and upstanding threaded studs or bolts 326 carried by the bars 307 and 309 extend through openings in the bars 325 and the bolts are secured rigidly thereto as by means of the nuts 327. FIGURE 3 reveals that there are a plurality of openings 328 in the bar 325 through which the bolts 326 may extend, depending upon the thickness of the roast or other meat being supported.

At the bottom of the broiler as shown in FIGURE 2 there are disposed at least two cross pieces 330 which are notched at a plurality of points therealong as at 332. Once the approximate thickness of the meat to be supported in this broiler is determined, the bolts 326 are adjusted to the proper openings 328 in the upper bars 325 and then the lower cross bar 310 of the frame 302 and the lower cross bar 308 of the frame 303 are each forced into appropriate ones of the notches 332 in the bars 330 so as to clamp the roast firmly therein.

It is obvious that the broiler can be swung to any angular position with relation to the fire, a substantially horizontal position being shown in broken lines in FIGURE 2.

One important feature of this embodiment resides in the angular cross section of the grid bars 304 and also the breaking of the continuity of these angular bars as at 340 near the mid-portion. As the cooking proceeds, the juices from the meat will be caught in these trough-like bars and run down the troughs and be discharged either at the outer ends of the bars 304 or through the break 340 at the center point thereof, depending upon the angular position of the broiler.

Obviously, a pan or other receptacle may be placed beneath the broiler to catch the juices and they may be used in the preparation of gravies or the like.

In FIGURE 7 there is illustrated in cross section a grid bar 304' which is arcuate in cross section in order to provide a trough, all points of which will be substantially evenly heater, and thus avoid any possibility of the juices or gravy being scorched or retained in a sharply angled crevice.

It should be noted that, as used in the subjoined claim, the "ends" of the grid illustrated in FIGURES 1 and 2 of the drawings and of the component panels and bracing members thereof, are understood to be the portions shown at the top and bottom of the respective figures, and that the "sides" of said grid are intended to be the lateral portions as viewed in FIGURE 1 at which the respective trunnions are located.

It is understood that various changes and modifications may be made in the embodiments illustrated and described herein without departing from the scope of the invention as determined by the subjoined claim.

Having thus described the invention, what is claimed as new and desired to be secured by Letters Patent is:

A cooking apparatus especially adapted for outdoor use which comprises an adjustable broiler grid for containing meat or other comestible: said grid comprising a skeleton framework generally hexagonal in vertical cross-section; said framework comprising a pair of oppositely disposed unitary and separately formed barred panels each comprising two rectangular portions set at an angle to each other to provide concavities, the two panels having their concavities facing each other from opposite sides of the center of said grid, the rectangular portions of the two panels constituting four sides of the hexagonal section of the device, said panels connected at their respective opposite ends by spreaders comprising cross-connection members of adjustable effective lengths whereby the panels may be brought to closely embrace comestibles of various sizes placed between them, said spreaders constituting the two opposite remaining sides of the hexagonal section; an angular bracing member at each end of the grid and having its opposite ends secured respectively to the end portions of one only of said facing panels, said bracing members disposed between said panels and having their internal angles facing the panel to which they are secured thus forming therewith a diamond-shaped configuration; a slotted element connecting the mid-points of each of said angled bracing members with the mid-points of the ends of said last named panel; and trunnion elements adjustably disposed along said slotted elements for pivotally supporting said grid at selected points according to the position of the center of gravity of the comestible carried thereby, said trunnion elements extending perpendicularly to the hexagonal cross-sectional plane of the grid.

References Cited in the file of this patent

UNITED STATES PATENTS

| | | |
|---|---|---|
| 842,695 | Peters | Jan. 29, 1907 |
| 2,198,134 | Spiegel | Apr. 23, 1940 |
| 2,839,989 | Persinger | June 24, 1958 |

FOREIGN PATENTS

| | | |
|---|---|---|
| 3,969 | Great Britain | Feb. 21, 1896 |